(12) United States Patent
McClintock

(10) Patent No.: US 10,089,650 B1
(45) Date of Patent: Oct. 2, 2018

(54) LEVERAGING AD RETARGETING FOR UNIVERSAL EVENT NOTIFICATION

(71) Applicant: Amazon Technologies, Inc., Reno, NV (US)

(72) Inventor: Jon Arron McClintock, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 382 days.

(21) Appl. No.: 13/945,745

(22) Filed: Jul. 18, 2013

(51) Int. Cl.
*G06Q 30/02* (2012.01)

(52) U.S. Cl.
CPC ............................... *G06Q 30/0255* (2013.01)

(58) Field of Classification Search
CPC ............... G06Q 30/00; G06Q 30/0207; G06Q 30/0219; G06Q 30/0241; G06Q 30/0249
USPC .......... 705/14.73, 26.1, 26.64, 14.4; 725/34; 709/203
See application file for complete search history.

(56) References Cited

U.S. PATENT DOCUMENTS

| 2007/0073593 | A1* | 3/2007 | Perry ..................... G06Q 30/02 705/26.64 |
| 2007/0174117 | A1* | 7/2007 | Hendrickson .......... G06Q 30/02 705/14.4 |
| 2008/0015951 | A1* | 1/2008 | Kerker et al. ................... 705/26 |
| 2010/0049614 | A1* | 2/2010 | Vilcauskas et al. ....... 705/14.73 |
| 2011/0296456 | A1* | 12/2011 | Pandala ............ G06F 17/30029 725/34 |
| 2014/0337405 | A1* | 11/2014 | Athas ..................... H04L 67/26 709/203 |

* cited by examiner

*Primary Examiner* — Marilyn G Macasiano
(74) *Attorney, Agent, or Firm* — Kilpatrick Townsend & Stockton LLP

(57) ABSTRACT

Method and systems for providing universal event reminders in place of advertisements by leveraging advertisement retargeting. Information about a reminder event and a registered interest associated with the reminder event is received from a browser utilized by a user. The user's browser is then directed to provide the registered interest and information about accessing the reminder to an advertising service. In response to receiving a request for content from the browser, the request for content being generated in response to the browser receiving information about accessing the reminder from the advertising service, serving to the browser the reminder.

18 Claims, 11 Drawing Sheets

LEVERAGING AD RETARGETING FOR UNIVERSAL EVENT NOTIFICATION

BACKGROUND

Advertisements appearing while browsing the World Wide Web are now common place. Online advertisements serve an important role in electronic commerce by providing vendors an opportunity to submit their various items and stock for viewing by consumers. The ability to solicit business from a consumer who is currently viewing a browsing page for content that is not related to the advertisement provides online vendors and businesses with additional chances to garner new sales. In addition, some online advertisements have links included within them that will move a consumer from their current browsing page to a vendor's web page thus providing the user with an opportunity to purchase a specific item included in the advertisement or browse through the catalog of items offered by the vendor.

Advertising services utilize different methods and systems for determining which particular advertisement should be displayed to a user's browsing page. Some systems parse the current browsing page of a user and generate advertisements with content similar to the browsing page. Other systems collect data from a user's recent browsing activity to attempt to provide targeted advertisements to the user based on their viewing history. Some systems utilize the information stored as browser cookies within a browser to help target specific advertisements to users based on their recent activity. However, some users who browse pages find advertisements invasive, boring and distracting. Online advertisements can display content completely unrelated to the current user's interests and thus be ignored at worst or thought of as a waste of space on the browsing page at best. It would be desirable to provide useful information to the user in place of nonrelated advertisements.

BRIEF DESCRIPTION OF THE DRAWINGS

Various embodiments in accordance with the present disclosure will be described with reference to the drawings, in which.

DETAILED DESCRIPTION

Figure 1:
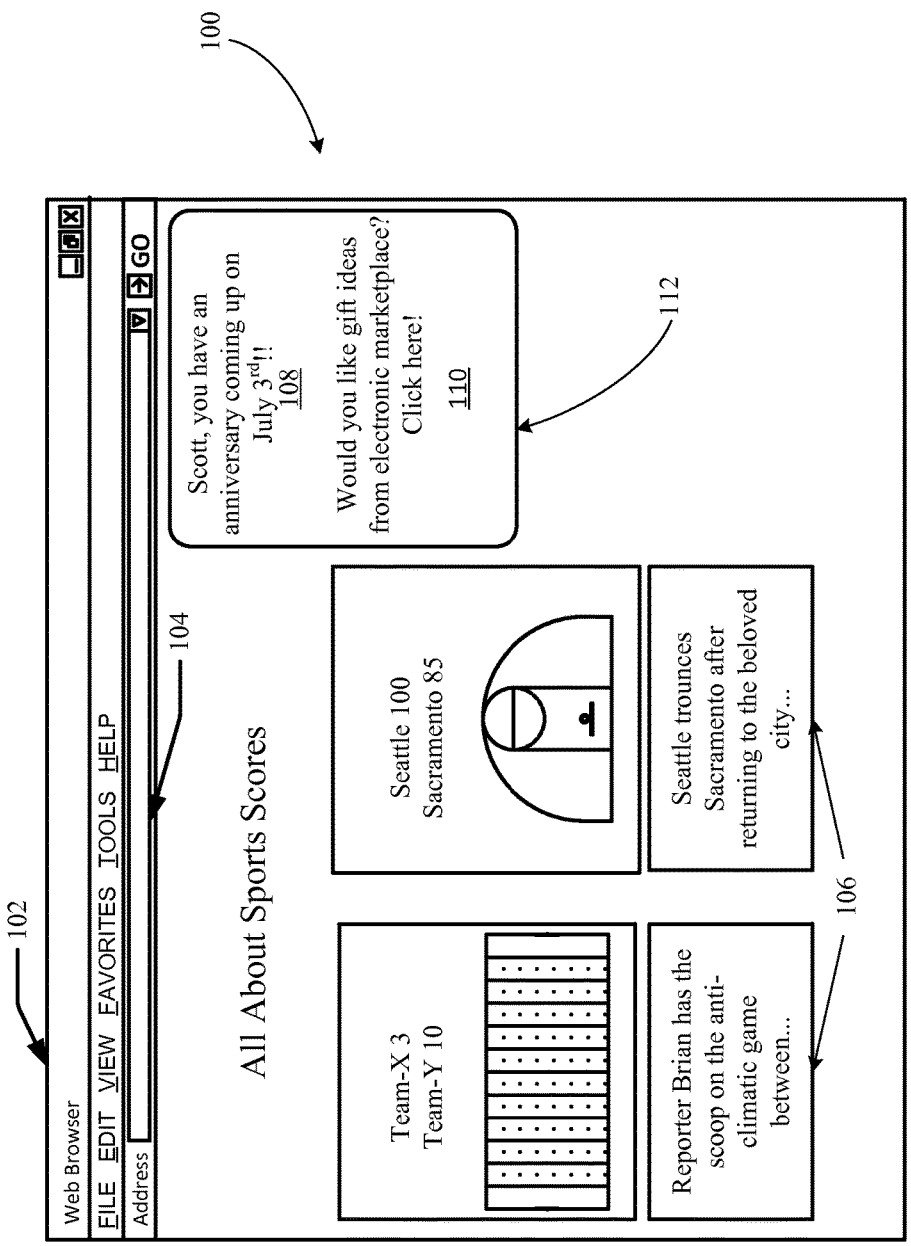
FIG. 1 illustrates an example of a web browser with a reminder event and a targeted advertisement in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggest herein include systems and methods for providing a reminder event (or reminder) to a user either in place of or in addition to an advertisement included in a browsing page. In some examples, the reminder events completely replace the advertisement that would have been provided to a user in response to a request for content from a browser. In other examples, the reminder event and an advertisement can share the space provided for the advertisement in a browsing web page. Further, in some examples, a reminder event and a targeted advertisement are provided in response to a request for content from a browser. The reminder event attempts to provide useful information to a user about an upcoming event or occasion (e.g., an anniversary, a birthday, etc.) for at least a variable amount of time. In some embodiments the reminder event persists until the user clicks the displayed reminder event.

In at least one embodiment, the reminder event is created by a user utilizing an agent's registration page. Once a user has browsed to the registration page he or she may enter relevant information such as: name; various contact information; the text comprising the event or occasion the user would like to be reminded about; the duration the user would like the reminder to exist; the calendar date of the event the user wishes to be reminded about, if relevant; and budget information which, in some embodiments, will be used to register an interest with an advertising service. In at least one embodiment, the user's browser ID is obtained from the browser the user is utilizing via a stored browser cookie. The browser ID is unique to each browser that is utilized by a user. In at least one embodiment because the browser ID is unique to each browser, a user may create a set of different reminders to display depending on the browser the user is utilizing at any given moment.

Once a user has created his or her reminder event, the agent will then use the provided information of the reminder event to register an interest with an advertising service on behalf of the user. In embodiments, to register the interest, the agent instructs the user's browser to register the interest, for example by embedding the interest in a uniform resource locator (URL) that is provided to the user's browser. In some examples, the advertising service and electronic marketplaces can be hosted by third parties accessible via one or more third party computers or servers. Additionally, third party advertising agencies may be accessed or stored on one or more third party computers or servers. The budget information of the reminder event can be an amount of money that corresponds to a maximum bid amount that a user is willing to spend, a flat fee that the user wishes to pay to ensure the reminder event is displayed, or a fixed fee that the agent will attempt to register the interest with. Additionally, the budget information of the reminder event can be a commission fee paid to the reminder agent on behalf of the user to register the interest with an advertising service. Afterwards, in accordance with embodiments, the advertising service determines whether the registered interest on behalf of the reminder should be selected or an interest associated with one of a plurality of advertising agencies should be selected in response to the browser the user is utilizing requesting content. Information about the winning interest and/or advertising agency is provided to the user's browser. In some examples, if the registered interest on behalf of the reminder is selected, the agent provides the reminder event to the user's browser for use (e.g., display). Further, the advertising service can select advertisements from separate advertising agencies and information about these agencies can be provided to the browser. In at least one embodiment, the advertising service's determination is based on comparing the budget information of the reminder event with the budget information of various advertising agencies that are associated with the advertising service or solicited by the advertising service. If the budget amount included in the budget information of the reminder event is greater than the budget allocated by the various advertisers, than the user's browser is directed to request content from the agent resulting in the reminder event being provided in place of the advertisement on the web page. Otherwise, the advertisement with the highest budget amount will eventually be provided by an advertising agency. In at least one embodiment, the user can forgo entering a budget amount in the budget information. Instead the user may agree to share the advertisement space thus displaying the reminder event and an advertisement from a specific advertiser persistently.

In at least one embodiment, the agent can map or receive the browser ID associated with the user from the browser utilized by the user. The mapped or received browser ID can be used to provide targeted advertisements to the user. For example, when a user goes to the product detail page of an electronic marketplace, the electronic marketplace can register an interest with the advertising service using the user's browser ID. When the user then browses to a web page that requests an advertisement, the advertising service can request a targeted advertisement from the electronic marketplace corresponding to the user's browser ID. In some examples, this type of targeted advertisement can be displayed with the reminder event or included as a link within the reminder event. In at least one embodiment, the agent is associated with an electronic marketplace and can include a link to a recommended item in the electronic marketplace with the reminder event. In still other embodiments, the browser ID communicated to the agent is never shared with an advertising service or electronic marketplace. Instead, each individual actor receives a browser ID that it associates with the user's browser without any context or knowledge of other actors performing a similar action. It should be noted that while certain examples describe receiving a request to provide content to a web page, the request for and provisioning of a reminder event can be implemented across various mediums (e.g., Television, mobile phones or applications, video games, etc.) and to native applications in addition to browsers.

FIG. 1 depicts an illustrative example of different portions of a web page 100, in accordance with an embodiment. In this particular example, the web page 100 is presented using a web browser 102. The web page illustrated in FIG. 1 includes an address bar 104 where a user may enter a Uniform Resource Locator (URL) to view a specific web page. Further, the web page illustrated in FIG. 1 includes text and image content 106 related with an example web page, here "All About Sports Scores." In this example, the text and image content 106 includes sports scores and related articles. Finally, the web page illustrated in FIG. 1 includes a reminder event 108 for a particular user and an advertisement for an electronic market place 110 displayed in the same advertisement window or space 112.

Accordingly, FIG. 1 illustrates the web page 100 which may have been displayed to a user after entering the URL for the All About Sports Scores in the address bar 104 where the text and image content 106 was displayed to the user, along with a reminder event 108 for the particular user Scott and an advertisement 110 for an electronic marketplace. In some embodiments, as the user enters different addresses or URLs in the address bar 104, he/she may be served with different text and image content (such as 106) for various web pages but the reminder event 108 persists in displaying in the advertisement space or window 112. It should be noted that while in this particular example the advertisement space or window 112 is located on the right side of the web page 100, the reminder event 108 can be displayed in any advertisement space or window 112 no matter where it is located in the web page 100.

In one example, as web pages are displayed, such as web page 100, only the reminder event 108 will be displayed in the advertisement space or window 112. In other examples, based on the determination of the advertising service and the budget information of the reminder event, only the advertisement 110 will be displayed to a user. In one example, the reminder event 108 may contain a link which, when clicked on by a user, will take the user to a new web page. The new web page displayed to the user can correspond, as examples, to either a vendor or electronic commerce web site where the user can browse items related to the reminder event. In other examples, the link included in the reminder event 108 will take the user to an electronic marketplace where a user can search for items which may be related to the reminder event. For example, the reminder event 108, which discusses an anniversary, may include a link to an electronic marketplace which may display different options to purchase and deliver flowers or chocolates. In some embodiments, as the user utilizes different web browsers 102 he/she may be presented with different reminder events 108 depending on the particular web browser 102 and whether the user entered different reminder event text in the reminder registration agent as displayed in FIG. 2.

Figure 2:
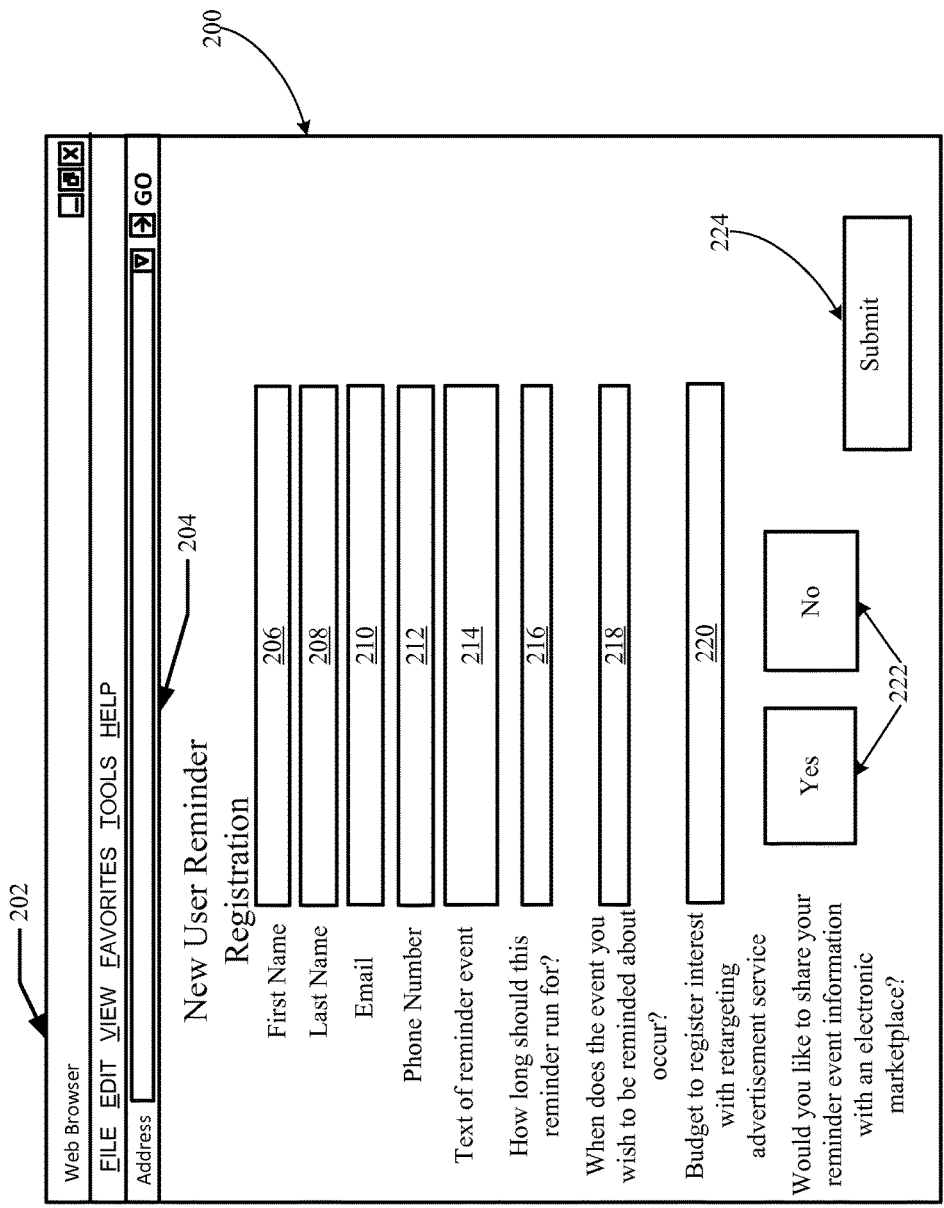
FIG. 2 illustrates an example of an event reminder registration agent via a webpage interface in accordance with at least one embodiment.

FIG. 2 depicts an illustrative example of an event reminder registration page provided by a registration agent, in accordance with one embodiment. In this particular example, the event reminder registration agent is displayed to a user via a web page 200 presented by a web browser 202. It should be noted that while the event reminder registration agent is discussed in this example as utilizing a web page interface, any user friendly interface known in the art may be utilized such as graphical user interfaces (GUIs), mobile phone applications, etc. The web page 200 illustrated in FIG. 2 includes an address bar 204 where a user may enter a URL to browse to the event reminder registration agent. Further the web page 200 illustrated in FIG. 2 includes information fields where a user can enter personal identification/contact information such as the user's first name 206, last name 208, email address 210 and phone number 212. Further, the web page 200 illustrated in FIG. 2 includes information fields where a user can enter information about the reminder event such as text the user wants the reminder event to be composed of 214, the duration of time the user wants the event reminder to be displayed 216, the date of the event the user wishes to be reminded about occurs 218, the budget or amount of money the user wishes to allocate to register an interest with an advertising service 220, and an option for the user to choose whether they would like to share their reminder event information with an electronic marketplace 222. Finally, a submit button or link 224 is included in the web page 200 illustrated in FIG. 2 that the user can click on to complete their part of the registration of the reminder event with an advertising service.

While, for the purpose of illustration, a set of information fields have been provided to allow a user to register an interest of a reminder event with an advertising service are presented in FIG. 2, embodiments of the present disclosure are applicable in other contexts as well. For example, in one example, fewer or more information fields may be presented to a user to allow them to register an interest of a reminder event with an advertising service. In an alternative example, certain fields may be pre-filled with information obtained from the user's browser or browser cookies. In another alternative embodiment, certain fields such as the text of the reminder event may include pre-generated events, such as birthdays, anniversaries, weddings, etc., that the user may choose from.

In one example, a user enters the URL for the event reminder registration agent in the address bar 204 of a web browser 202 and is presented with the new user reminder registration web page 200. In an embodiment, the user fills the information fields 206-222 with his/her personal identification information and the information associated with the reminder event. After the user has entered the information required to register a reminder event with an advertising service he/she may click on the submit button 224 to complete the registration. In an embodiment, the event reminder registration agent displayed on web page 200 obtains information about the user's browser and registers an interest on behalf of the user with an advertising service, the process of which will be discussed below with reference to FIGS. 5 and 9.

Figure 3:
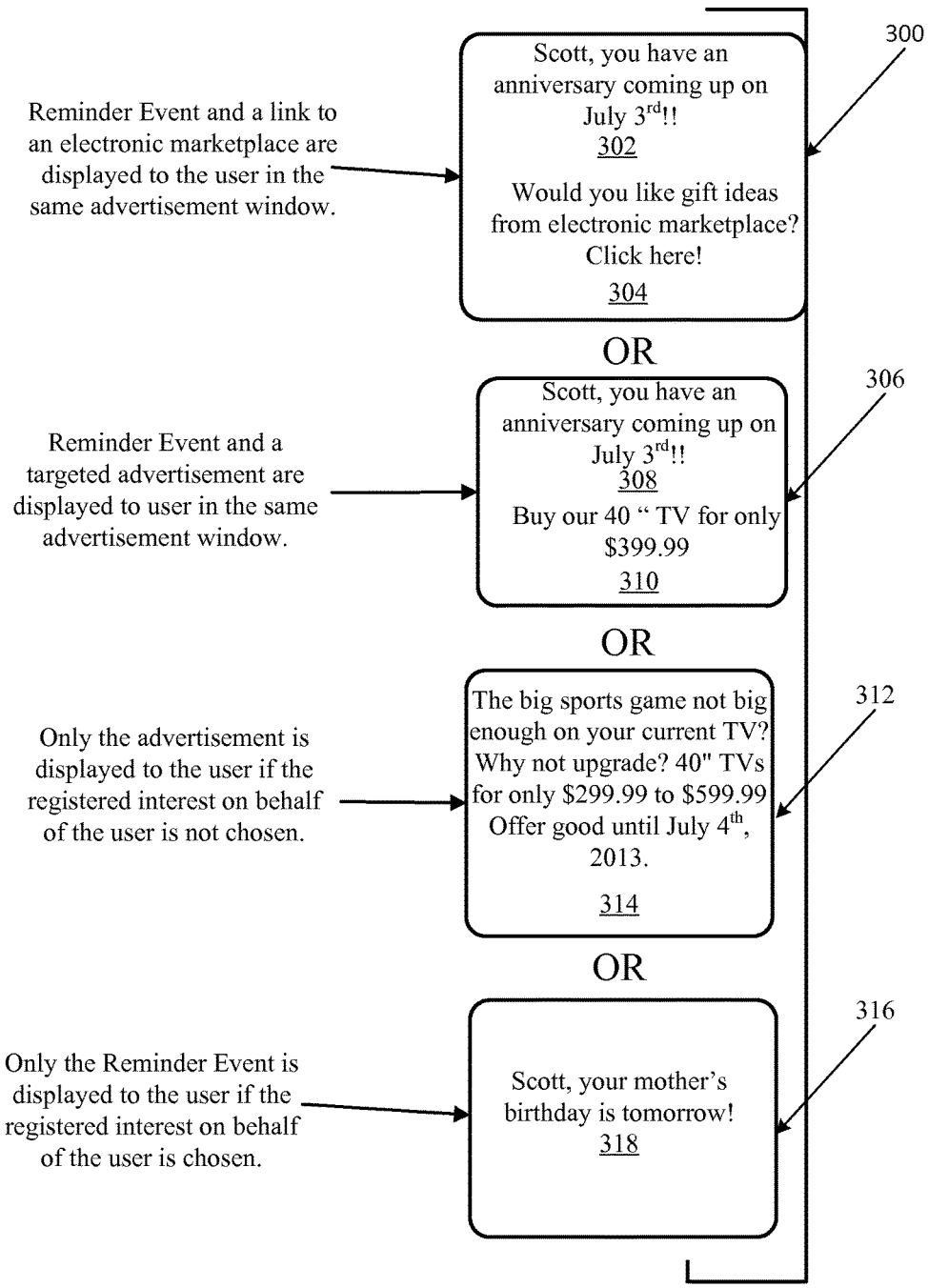
FIG. 3 illustrates examples of possible combinations of reminder event and electronic marketplace link, reminder event and targeted advertisement, an advertisement, or reminder event displayed in an advertisement window or space.
Figure 4:
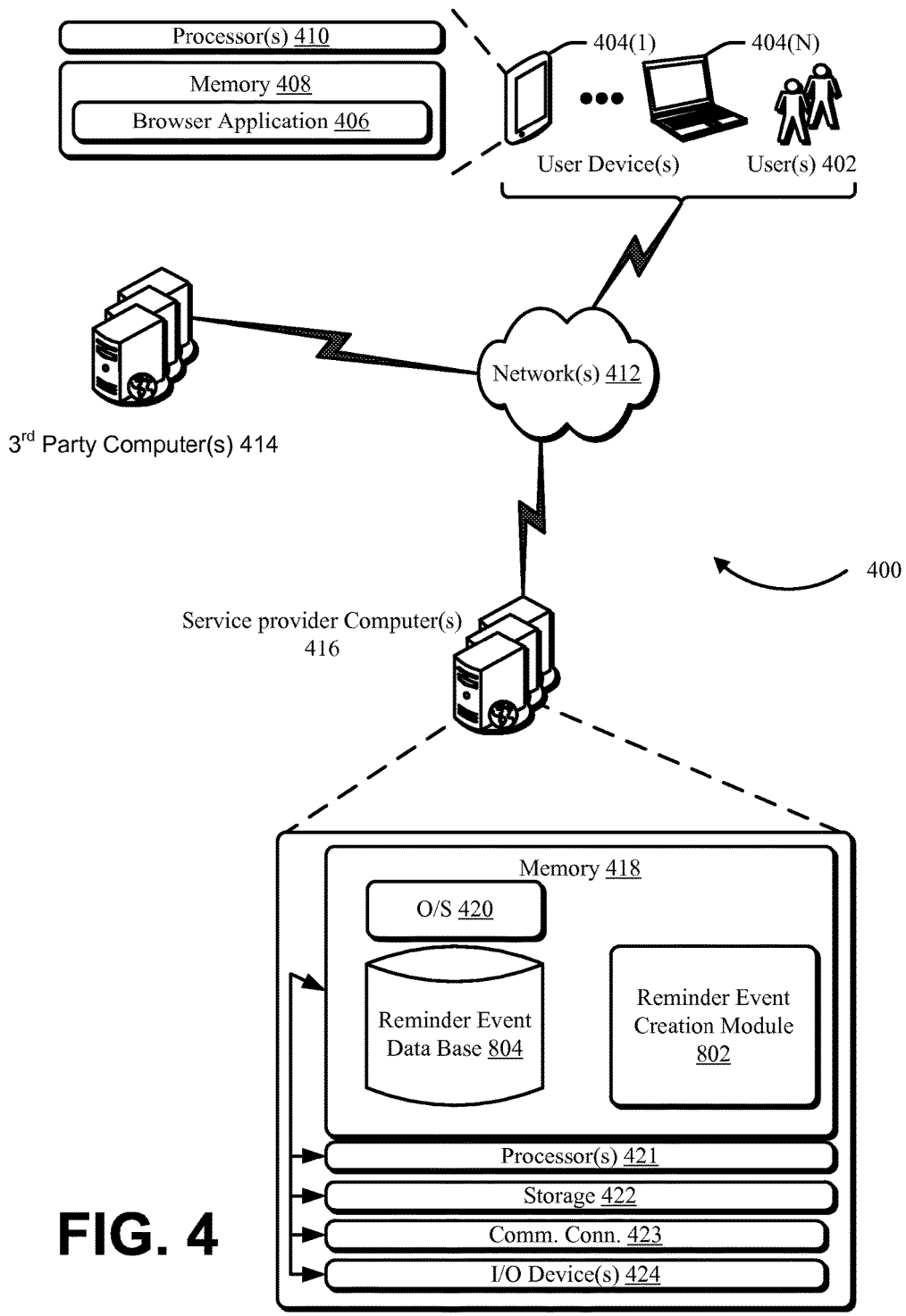
FIG. 4 illustrates an example architecture for implementing reminder event notifications according to at least one example.

Before turning to FIG. 4, it will be helpful to have reference to an example set of reminder event and advertisement options that can be presented to a user based on the registered interest submitted by the event reminder registration agent displayed on web page 200. FIG. 3 depicts illustrative examples of the reminder event and/or an advertisement displayed in the advertising window or space 112. In some embodiments, the advertising window or space 300 includes a reminder event 302 with a solicitation or advertisement to an electronic marketplace 304. As described above in some embodiments, the reminder event 302 may display with a link to an electronic marketplace 304 because the user has agreed to forgo paying a budget amount or pay a lower budget amount in exchange for agreeing to share space with an advertiser or electronic marketplace. In this described example, the user gains the benefits of paying nothing or less for the registered interest with an advertising service, and having the reminder event 302 always appear when the user browses to web pages which display advertisements in exchange for having a persistent link to an electronic marketplace 304. It should be noted that while the link to the electronic market place 304 is distinctly displayed from the reminder event 302, in some embodiments the link can be embedded or included within the reminder event and thus not readily visible to a user.

In an embodiment, shown as an alternative in FIG. 3, an advertising window or space 306 includes a reminder event 308 and a targeted advertisement 310. As described above in some embodiments, the targeted advertisement 310 may be related to the user's recent browsing history or activity in an electronic marketplace or online vendor. Similar to the example advertisement window 300, the advertising window or space 306 can include both a targeted advertisement and the reminder event displayed to a user in exchange for forgoing entering an amount of money in the budget information 220, or a reduced amount. Further, in another embodiment, an advertisement window or space 312 includes only an advertisement 314. In some examples, the advertisement 314 is displayed to a user because the budget amount entered by a user in the budget information 220 and used to register an interest with the advertising service is not greater than budgets offered by the various advertising agencies interested in displaying advertisements on the current browsing web page. In yet another embodiment, an advertisement window or space 316 includes only a reminder event 318. In some examples, the reminder event 318 is displayed to the user because the budget amount entered by a user in the budget information 220 and used to register an interest with the advertising service is greater than any other advertiser's budget amount.

FIG. 4 depicts an illustrative system or architecture 400 in which techniques for providing event reminders to users browsing a web page may be implemented. In architecture 400, one or more users 402 may utilize user computing devices 404(1)-(N) (collectively, user devices 404) to access a browser application 406 (e.g., a web browser) or a user interface (UI) accessible through the browser application 406, via one or more networks 412. The "browser application" 406 can be any browser control or native application that can access and display a web page or other information. In some aspects, the browser application 406 may display the reminder events, advertisements, targeted advertisements and links to electronic marketplaces described above. In some aspects, the browser application 406 may be hosted, managed, and/or provided by a computing resources service or service provider, such as by utilizing one or more service provider computers 416. The one or more service provider computers 416 may, in some examples, provide computing resources such as, but not limited to, client entities, low latency data storage, durable data storage, data access, management, virtualization, cloud-based software solutions, electronic content performance management, etc. The one or more service provider computers 416 may also be operable to provide web hosting, computer application development, and/or implementation platforms, combinations of the foregoing, or the like to the one or more users 402.

In one illustrative configuration, the user devices 404 may include at least one memory 408 and one or more processing units or processor(s) 410. The processor(s) 410 may be implemented as appropriate in hardware, computer-executable instructions, firmware, or combinations thereof. Computer-executable instruction or firmware implementations of the processor(s) 410 may include computer-executable or machine-executable instructions written in any suitable programming language to perform the various functions described. The user devices 404 may also include geo-location devices (e.g., a global positioning system (GPS) device or the like) for providing and/or recording geographic location information associated with the user devices 404.

The memory 408 may store program instructions that are loadable and executable on the processor(s) 410, as well as data generated during the execution of these programs. Depending on the configuration and type of user device 404, the memory 408 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 408 may include multiple different types of memory, such as static random access memory (SRAM), dynamic random access memory (DRAM), or ROM.

Turning to the components of the memory 408 in more detail, the memory 408 may include an operating system and one or more application programs or services for implementing the features disclosed herein including at providing reminder events to the user via the browser application 406 or dedicated applications (e.g., smart phone applications, tablet applications, etc.). The browser application 406 may be configured to receive, store, and/or display a website, a reminder event, a targeted advertisement, a link to an electronic marketplace, or other interface for interacting with the one or more service provider computers 416. Additionally, the memory 408 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 402 provided response to a security question or a geographic location obtained by the user device 404.

In some examples, the networks 412 may include any one or a combination of many different types of networks, such as cable networks, the Internet, wireless networks, cellular networks and other private and/or public networks. While the illustrated example represents the users 402 accessing the browser application 406 over the networks 412, the described techniques may equally apply in instances where the users 402 interact with the one or more service provider computers 416 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 406 may allow the users 402 to interact with the one or more service provider computers 416, such as to access web content like web pages, reminder events and advertisements which may include links to an electronic marketplace. The one or more service provider computers 416, perhaps arranged in a cluster of servers or as a server farm, may host the browser application 406 and/or cloud-based software services. Other server architectures may also be used to host the browser application 406 and/or cloud-based software services. The browser application 406 may be capable of handling requests from many users 402 and serving, in response, various user interfaces that can be rendered at the user devices 404 such as, but not limited to, a website or web page. The browser application 406 can interact with any type of website that supports user interaction, including social networking sites, electronic retailers, informational sites, blog sites, search engine sites, news and entertainment sites, and so forth. The described techniques can similarly be implemented outside of the browser application 406, such as with other applications running on the user device 404.

The one or more service provider computers 416 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 416 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 416 may be in communication with the user device 404 via the networks 412, or via other network connections. The one or more service provider computers 416 may include one or more servers, perhaps arranged in a cluster or as individual servers not associated with one another. The one or more service provider computers 416 may be in communication with one or more third party computers 414 via networks 412. The one or more service provider computers 416 that host the browser application 406 may obtain and provide data to third party computers 414 via networks 412 in accordance with embodiments described herein.

In one illustrative configuration, the one or more service provider computers 416 may include at least one memory 418 and one or more processing units or processors(s) 421. The processor(s) 421 may be implemented as appropriate in hardware, computer-executable instructions, firmware, or combinations thereof. Computer-executable instruction or firmware implementations of the processor(s) 421 may include computer-executable or machine-executable instructions written in any suitable programming language to perform the various functions described. The memory 418 may store program instructions that are loadable and executable on the processor(s) 421, as well as data generated during the execution of these programs. Depending on the configuration and type of the one or more service provider computers 416, the memory 418 may be volatile (such as RAM) and/or non-volatile (such as ROM, flash memory, etc.). The one or more service provider computers 416 or servers may also include additional storage 422, which may include removable storage and/or non-removable storage. The additional storage 422 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 418 may include multiple different types of memory, such as SRAM, DRAM, or ROM.

The memory 418, the additional storage 422, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 418 and the additional storage 422 are all examples of computer storage media. Additional types of computer storage media that may be present in the one or more service provider computers 416 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 416. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 416 may also contain communication connection(s) 423 that allow the one or more service provider computers 416 to communicate with a stored database, another computing device or server, user terminals and/or other devices on the networks 412. The one or more service provider computers 416 may also include I/O device(s) 424, such as a keyboard, a mouse, a pen, a voice input device, a touch input device, a display, speakers, a printer, etc.

Turning to the contents of the memory 418 in more detail and as will be described in further detail in FIG. 8, the memory 418 may include an operating system 420, one or more data stores 804 and/or one or more application programs or services for implementing the features disclosed herein including a reminder event creation module 802. In general, the reminder event creation module 802 generates display information regarding an event for display by a browser of a user. The display information can be based upon information in the data stores 804. In some embodiments, the methods and processes described in reference to the reminder event creation module 802 and one or more data stores 804 can be performed previously, and accessed offline when needed. In other examples, the reminder event creation module 802 may be configured to generate or provide instructions to generate the one or more reminder events, links to electronic marketplaces, and targeted advertisements as described above. For example, the reminder event creation module 802 may be configured to simulate web page generation for testing or other analytical processes. When a user 402 enters a URL for a browsing web page or the event reminder registration agent, the browser application 406 may be configured to request electronic content (e.g., the reminder event, targeted advertisement, link to an electronic marketplace, the reminder event registration agent) from a source or host identified by the URL, in the described examples the one or more service provider computers 416. In some examples, the reminder event creation module can obtain data, generate and display the reminder event registration agent to a user 402 via the browser application 406 and networks 412.

Figure 5:
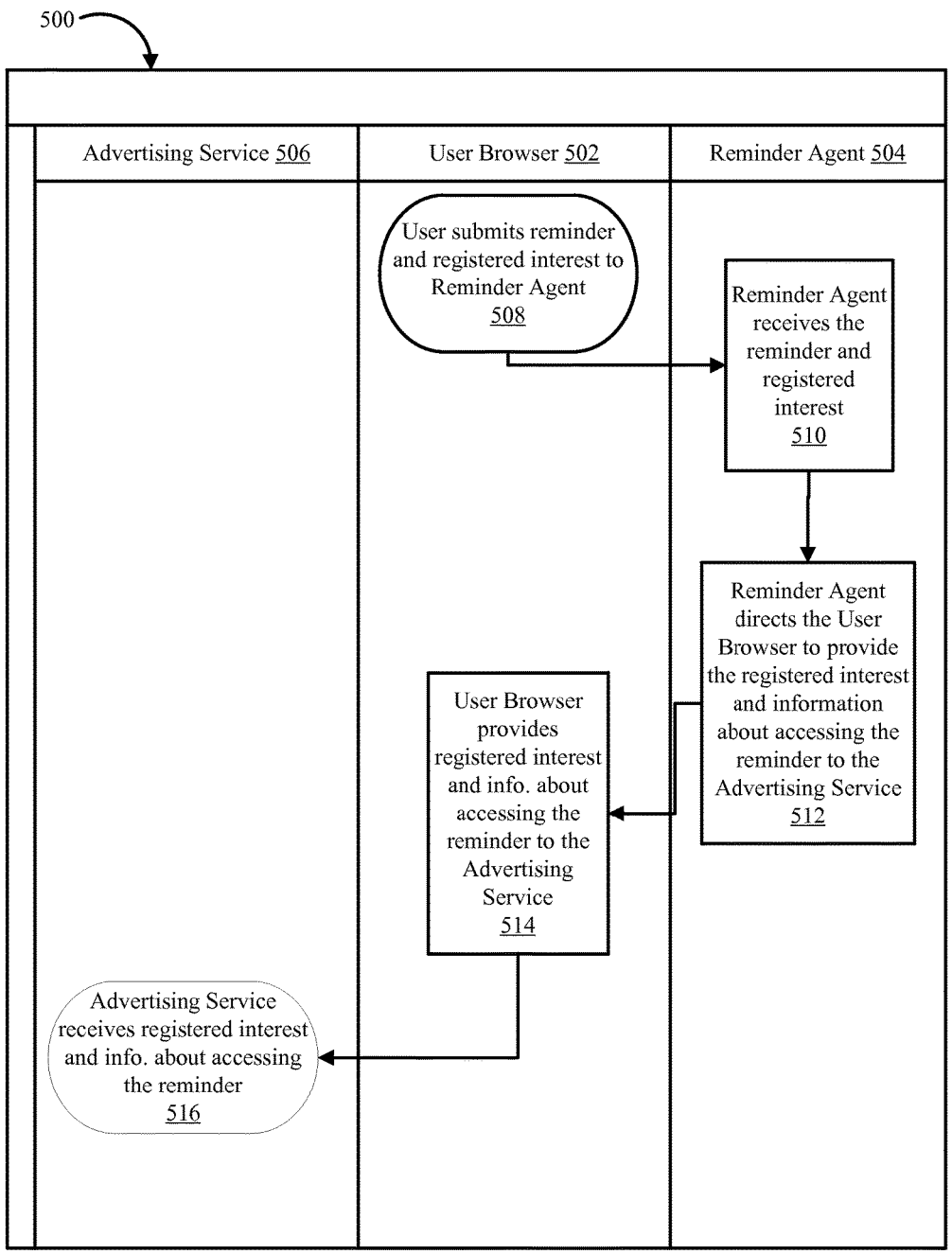
FIG. 5 illustrates a swim lane diagram depicting an example architecture for registering an interest in a reminder event with an advertising service on behalf of a user according to at least one example.

FIG. 5 illustrates a swim lane diagram depicting an example architecture for registering an interest with an advertising service on behalf of a reminder of a user. In architecture 500, one or more users 402 may utilize user computing devices 404(1)-(N) (collectively, user devices 404) to access a browser application 406/User Browser 502 or a user interface (UI) accessible through the browser application 406/User Browser 502, to communicate reminder information and a registered interest 508 to a Reminder Agent 504. The reminder information and registered interest 508 can include the information fields 206-222 of FIG. 2. Additionally, the one or more users 402 may utilize the event reminder registration agent of FIG. 2 to enter the information fields 206-222. The communication of the reminder and registered interest to the Reminder Agent 504 can be performed through networks such as 412. The Reminder Agent may be hosted, managed, and/or provided by a computing resources service or service provider, such as by utilizing one or more service provider computers 416.

In an example, the Reminder Agent 504 receives the reminder and registered interest 510, for example via a webpage that permits the user to enter the reminder information and a bid or other information representing a registered interest in the reminder. At 512, the Reminder Agent 504 directs the User Browser 502 to provide the registered interest and information about accessing the reminder to the Advertising Service 516. This may be done, for example, by embedding the registered interest and the information in a URL that is accessed (e.g., clicked upon) by the user on the webpage for registration. As an example, after a user enters the reminder and the interest on the Reminder Agent's webpage, the user hits a "submit" button or otherwise submits the information, and the submitting process generates a URL to a webpage for the Advertising Service. In some embodiments, once the user has submitted the reminder and interest on the Reminder Agent's webpage, the Reminder Agent directs the user browser to register the interest with the Advertising Service. In this way, the Advertising Service and the Reminder Agent never directly communicate. In an alternative embodiment, the user does not submit or enter an interest until the user has been directed to the webpage of the advertising agency. To this end, the registered interest may not be provided to, and may be unknown to, the Reminder Agent 504. The information about accessing the reminder can be, for example, a URL to the Reminder Agent, or other information about how to access the reminder. In some examples, the Reminder Agent 504 may obtain or extract budget information such as 220 from registered interest 510 when providing the registered interest to the Advertising Service 506. The User Browser 502 then provides the registered interest and information about accessing the reminder to the Advertising Service 506 at 514. If the registration is provided directly to the Advertising Service 506, then only the information about how to access the reminder may be provided. The Advertising Service 506 associates the registered interest and the information with the browser, for example by storing these with a browser ID. Finally, the Advertising Service 506 receives the registered interest and information about accessing the reminder 516, thus registering the interest in the reminder by a user utilizing a User Browser 502. In some embodiments, the advertising service may be hosted, managed, and/or provided by third party computers 414.

Figure 6:
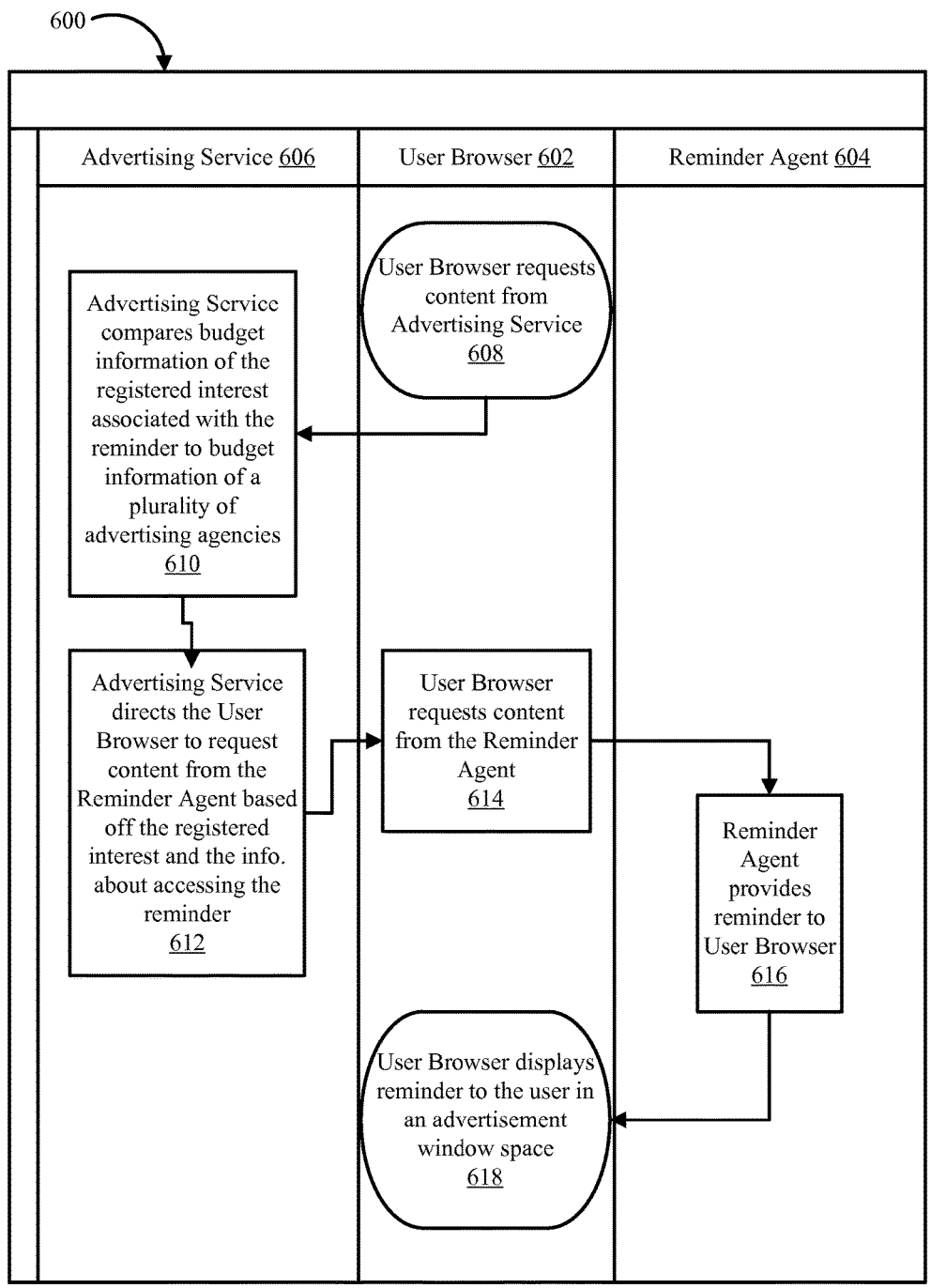
FIG. 6 illustrates a swim lane diagram depicting an example architecture for providing a reminder event to a browser of a user in accordance with at least one embodiment.

FIG. 6 illustrates a swim lane diagram depicting an example architecture for providing a reminder event to a browser of a user. In architecture 600, the User Browser 602 requests content from an Advertising Service at 608. The request for content from an Advertising service at 608 can be in response to a user browsing to any web page that displays advertisements. The Advertising Service 606 receives the request for content and then compares budget information of the registered interest associated with the reminder to budget information of a plurality of advertising agencies registered interests at 610. The Advertising Service 606 can determine that the registered interest is relevant due to receiving the browser ID with the request for content. In an embodiment, the Advertising Service 606 then directs the User Browser 602 to request content from the Reminder Agent if the budget information of the reminder is greater than the budget information of the plurality of advertising agencies. Directing the User Browser 602 to request content from the Reminder Agent may be based off the registered interest and the information about accessing the reminder at 612.

In some examples, at 614 the User Browser 602 requests content from the Reminder Agent 604. The Reminder Agent 604 then provides the reminder 616 to the User Browser 602. Finally, in some embodiments, the User Browser 602 displays the reminder to the user 618 in an advertisement window space such as 112. In some embodiments, the Reminder Agent 604 has pre-generated the reminder event to provide to the User Browser 602. In other embodiments, the Reminder Agent 604 merely provides information to the User Browser 602, the information instructing the User Browser 602 where the reminder may be found, such as an address included in a URL. The requests for content and communications described in FIG. 6 can be performed by networks 412 and involve one or more third party computers 414, one or more service provider computers 416, and one or more users 402 utilizing one or more user devices 404. The Advertising Service 506 and 606 may be comprised of several modules which will be discussed further below in reference to FIG. 7.

Figure 7:
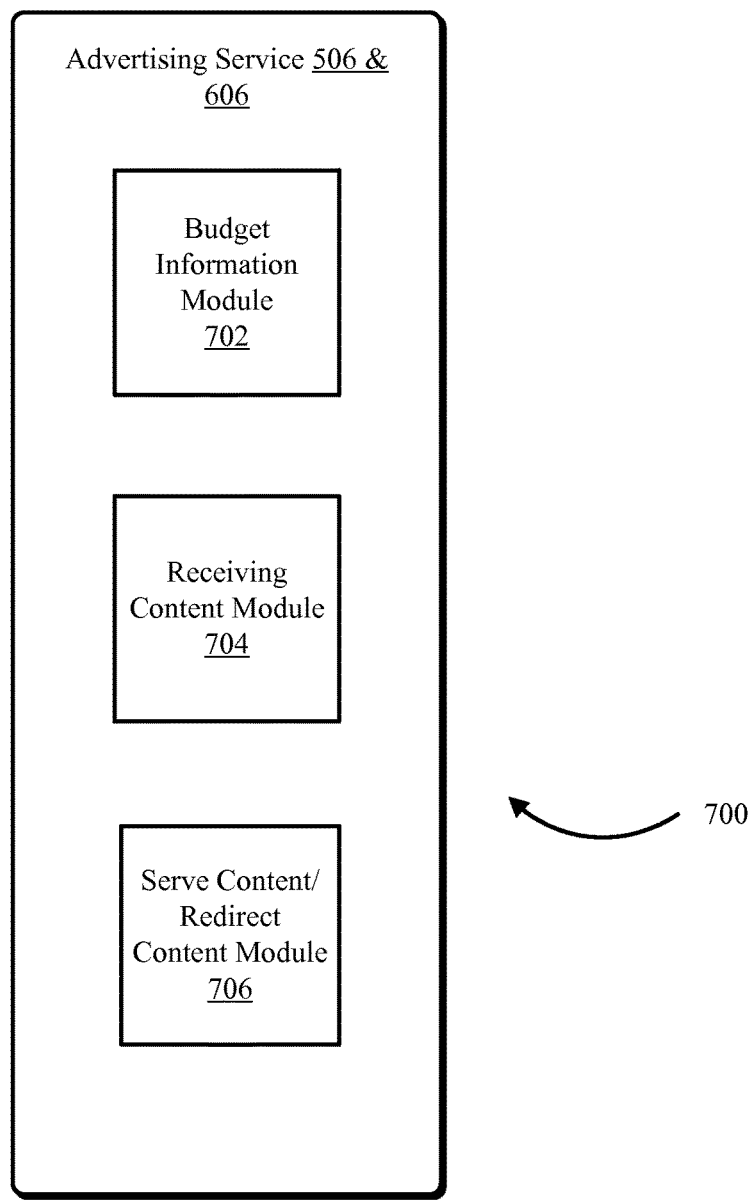
FIG. 7 illustrates a schematic diagram depicting aspects of an example advertising service facility in accordance with at least one embodiment.

FIG. 7 depicts aspects of an example advertising service facility 700 for receiving reminder event information and a registered interest such as 510. Further, the example advertising service facility 700 determines whether the registered interest on behalf of a user's reminder event or the registered interest on behalf of a plurality of advertising agencies should be selected based at least in part on budget information in response to a request for content. It should be noted that while multiple modules are described in the advertising service facility 700, the processes and methods described herein can be performed by more or less modules within memory such as memory 418 described above. In addition, while the modules 702-706 are displayed and described as distinct modules, in some embodiments they may be included within one another to further facilitate methods and systems described herein. Also, it should be noted that the described processes and architectures described below can be performed either in real-time or in an offline mode prior to any user interaction.

In some examples, the advertising service 506 and 606 may receive reminder event information and a registered interest such as 510 via a receiving content module 704. In an example, the advertising service 506 and 606 may utilize a budget information module 702 to extract budget information 220 and bid or compare the reminder event's budget with other advertisers' budget information, as described above and herein, to make the determination of which registered interest should be selected in response to a request for content. In some embodiments, the serve content/redirect content module 706 will communicate with a plurality of advertising agencies hosted by third party computers 414 to request an advertisement or direct a user's browser to request content from a reminder agent 504. The serve content/redirect content module 706 may in some embodiments direct the user's browser to request content from one of the identified plurality of advertising agencies. Further, the serve content/redirect content module 706 can provide said determined advertisement or direct the user's browser to request content from a reminder agent 504 via networks 412.

Figure 8:
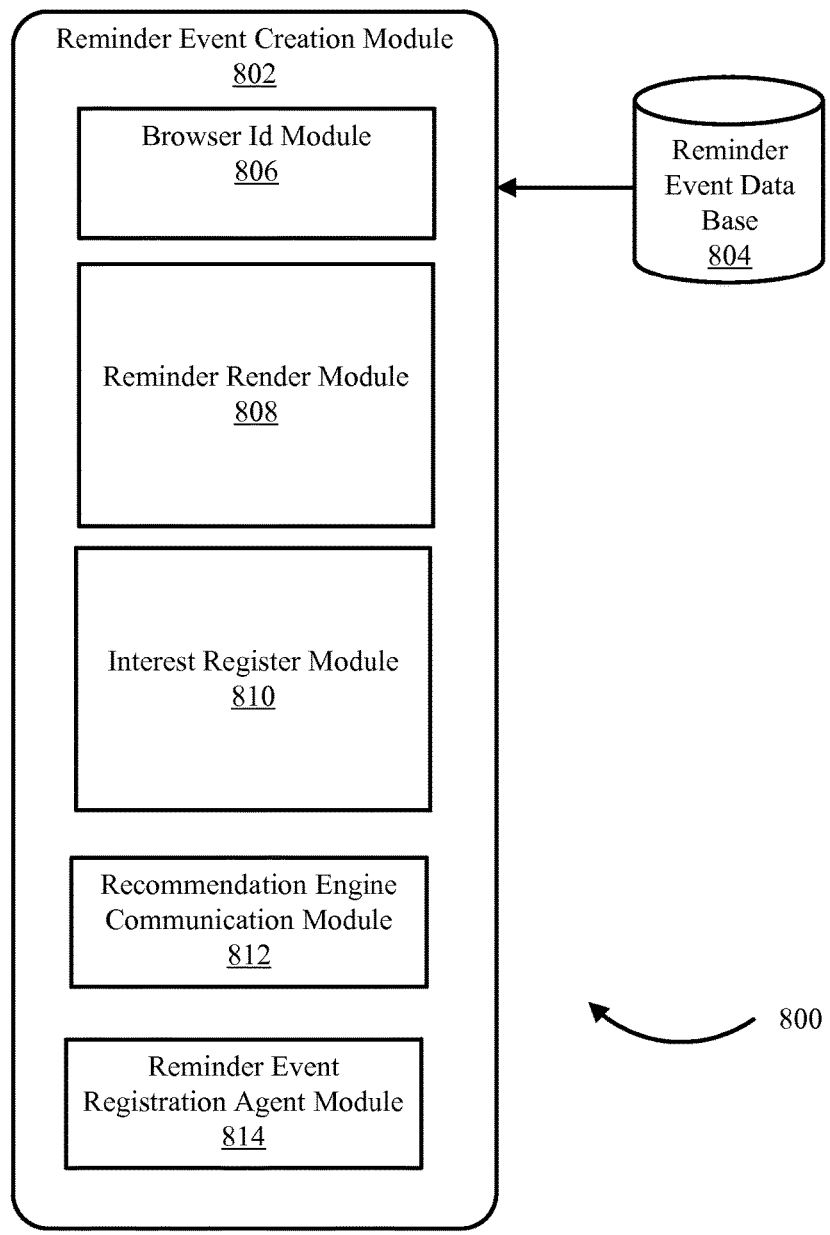
FIG. 8 illustrates a schematic diagram depicting aspects of an example event reminder notification facility in accordance with at least one embodiment.

FIG. 8 depicts aspects of an example event reminder notification facility 800 for registering interests with an advertising service and providing reminder events in accordance with embodiments. It should be noted that while multiple modules are described in the reminder notification facility 800, the processes and methods described herein can be performed by more or less modules within memory 418. In addition, while the modules 802-814 are displayed and described as distinct modules, in some embodiments they may be included within one another to further facilitate methods and systems described herein. Also, it should be noted that the described processes and architectures described below can be performed either in real-time or in an offline mode prior to any user interaction. In some examples, the reminder event creation module 802 may obtain or receive a user's 402 browser ID. In some embodiments, the browser ID can be used by an electronic marketplace to provide targeted advertisements or recommendations for advertisements if the one or more service provider computers 416 are associated with an electronic marketplace. The browser ID or information about the browser utilized by the user can be communicated to an electronic marketplace via the recommendation engine communication module 812. The recommendation engine communication module 812 can also receive links from the electronic marketplace or targeted advertisements to include with or in the reminder event provided to the user via the reminder render module 808. In some examples, the Reminder Render Module 808 merely directs the user's browser to a location, such as a URL, where the reminder can be located.

In some examples, the browser ID can be captured by the reminder event registration agent module 814. Additionally, in some embodiments, as described above a user 402 may enter the URL for the reminder event registration agent in the address bar 202 of a web browser 202. The user would then be provided a web page 200 for entering the reminder event information 206-222. The web page 200 can in some embodiments be generated and displayed to the user 402 via the reminder event registration agent module 814. The reminder event registration agent module 814 may then communicate the reminder event information 206-222 with a reminder render module 808 and an interest register module 810 to an advertising service. In an embodiment, the reminder render module 808 may take the information passed to it by the reminder event registration agent module 814 and render a reminder event such as 316. The rendered reminder event is then forwarded to the user's browser in response to a request for content from the user's browser.

In an embodiment, a pre-generated reminder event 316 may be stored in a reminder event data base 804 for use at a later time or generated real time and served to a web page requesting an advertisement or content. In some examples, the interest register module 710 takes the reminder event information 206-222 and registers an interest in the event information with an advertising service. The communication to the advertising service can be performed through the networks 412 and may be further communicated to advertising agencies within the service provider computers or advertising agencies accessed via third party computers 414 over networks 412.

Figure 9:
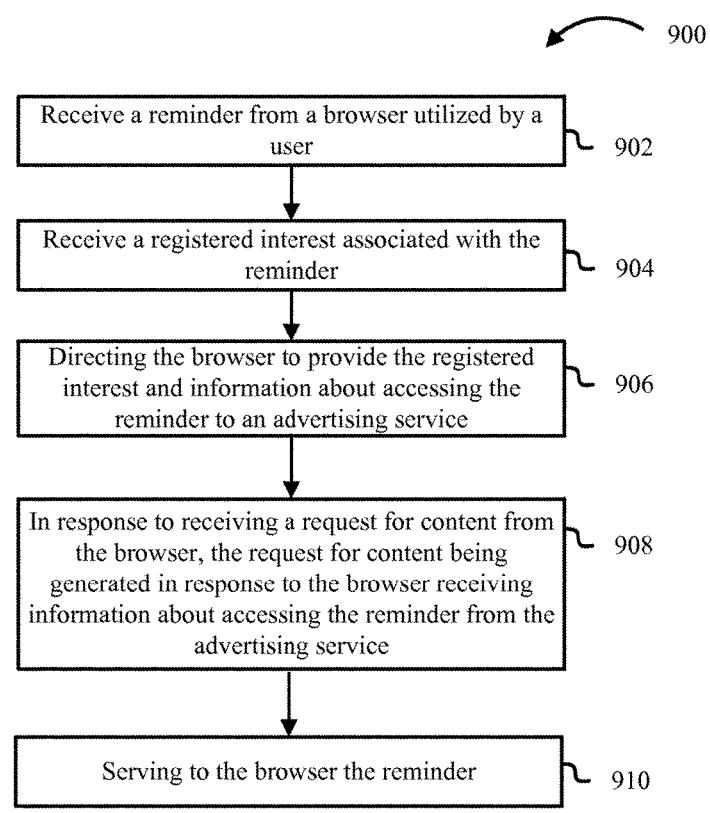
FIG. 9 illustrates a flow diagram of a process for registering an interest of a reminder event in an advertising service by an agent and providing the reminder event to a browser of a user.
Figure 10:
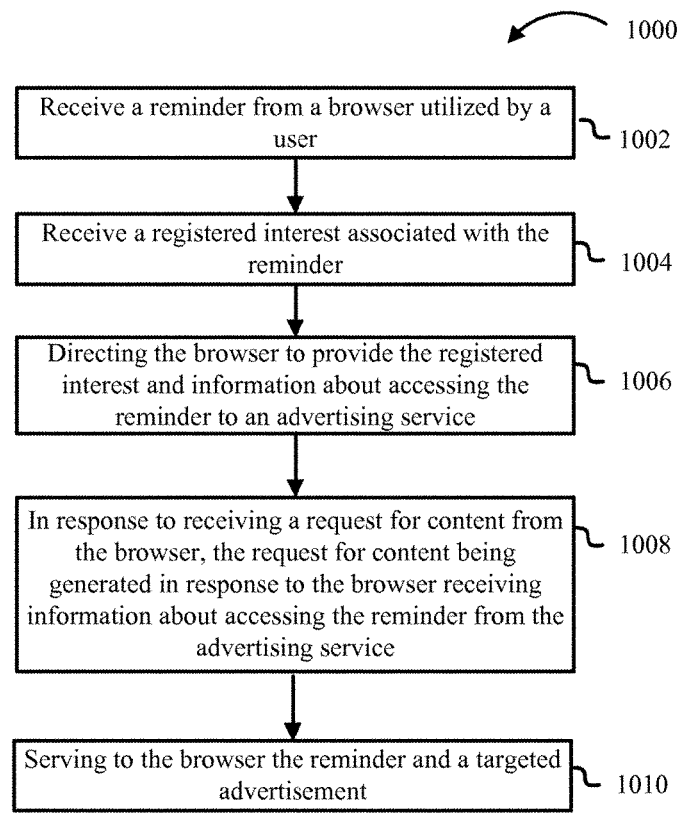
FIG. 10 illustrates a flow diagram of a process for registering an interest of a reminder event in an advertising service by an agent and providing the reminder event and a targeted advertisement to a browser of a user in accordance with embodiments.

FIGS. 9 and 10 illustrate example flow diagrams showing respective processes 900 and 1000 for providing reminder event notifications, according to at least a few examples.

These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 416 (e.g., utilizing at least one of the reminder event creation module 802 and the one or more data stores 804) and one or more third party computers 414 shown in FIGS. 4 and 8, respectively, may perform the process of FIG. 9. In 902-906, a reminder event is registered with the advertising service, along with a registered interest in the reminder event. The process 900 may begin at 902 by receiving or obtaining a reminder from a browser utilized by a user such as 406 or 502. The reminder may include information such as information fields associated with a reminder in 206-222. At 904, the process 900 may include receiving a registered interest associated with the reminder. The steps of 902 and 904 may be communicated to a reminder agent such as 504 via the networks 412. At 906, the process 900 may include directing the browser or user browser 502 to provide the registered interest and information about accessing the reminder to an advertising service such as 506. As described above, the information about accessing the reminder can be embedded in the registered interest in a uniform resource locator (URL) that is provided to the user's browser. After 906 the user has effectively registered an interest with an advertising service.

The process of 900 continues at 908, where in response to receiving a request for content from the browser, the request for content being generated in response to the browser receiving information about accessing the reminder from the advertising service, and ends at 910 by serving to the browser the reminder. It should be noted that in some examples the request for content being generated in response to the browser receiving information about accessing the reminder from the advertising service is determined, as described above, by the advertising service comparing budget information of the registered interest associated with the reminder to budget information of a plurality of advertising agencies. The advertising service can utilize a bidding process to determine which registered interest qualifies to display in the advertisement window or space 300, 306, 312 and 316. If the plurality of agencies do not bid an amount greater than the maximum bid amount included in the budget information 220 of a user 402 then the users browser will be directed to request content from the reminder agent and the reminder will be displayed to a user upon viewing a browsing web page that has an advertisement space or window that requests content from the advertising service that the user has registered an interest with via the reminder event registration agent described in FIG. 2. The budget information 220 can be in the form of a commission fee, a flat fee or fixed fee that will always be used in the bidding or comparison process described above. If the plurality of agencies do bid an amount greater than the maximum bid amount included in the budget information 220 of a user 402 then the user's browser will either be served an advertisement directly from the advertising service or directed to a location where an advertisement can be located such as a URL for an advertising agency. This location can be, for example, the agent.

FIG. 10 illustrates an example flow diagram showing a process 1000 for displaying both a reminder event and a targeted advertisement in response to a request for content from a user's browser. In some examples, the one or more service provider computers 416 (e.g., utilizing at least one of the reminder event creation module 802 and the one or more data stores 804) and one or more third party computers 414 shown in FIGS. 4 and 8, respectively, may perform the process of FIG. 10. In 1002-1006, a reminder event is registered with the advertising service, along with a registered interest in the reminder event. The process 1000 may begin at 1002 by receiving or obtaining a reminder from a browser utilized by a user such as 406 or 502. The reminder may include information such as information fields associated with a reminder in 206-222. At 1004, the process 1000 may include receiving a registered interest associated with the reminder. The steps of 1002 and 1004 may be communicated to a reminder agent such as 504 via the networks 412. At 1006, the process 1000 may include the reminder agent directing the browser or user browser 502 to provide the registered interest and information about accessing the reminder to an advertising service such as 506. After 1006 the user has effectively registered an interest with an advertising service.

The process of 1000 continues at 1008, where in response to receiving a request for content from the browser. The request for content can be generated in response to the browser receiving information about accessing the reminder from the advertising service. The information can be, for example, a URL to the reminder agent. At 1010 the browser is served the reminder and a targeted advertisement. It should be noted that the bidding or comparing budget information step described in process 900 may be excluded if the user chooses to share the advertisement space with an advertisement or targeted advertisement such as 300 or 306. As described above, the user may benefit from forgoing paying a monetary value for the reminder event in exchange for a persistent targeted advertisement provided by an electronic marketplace or one of the plurality of advertising agencies, being displayed along with the reminder event in the same advertising window or space. The budget information 220 of a user 402 may still include a commission fee, a fixed fee or flat fee in order to have a guaranteed reminder served with an advertisement or the user may forgo paying any amount of money in exchange for having a persistent advertisement or targeted advertisement displayed with the reminder. Further, in some embodiments the reminder event may be served with a link to an electronic marketplace that may contain recommended items based off a user's recent viewing activity such as 300 or 306.

Figure 11:
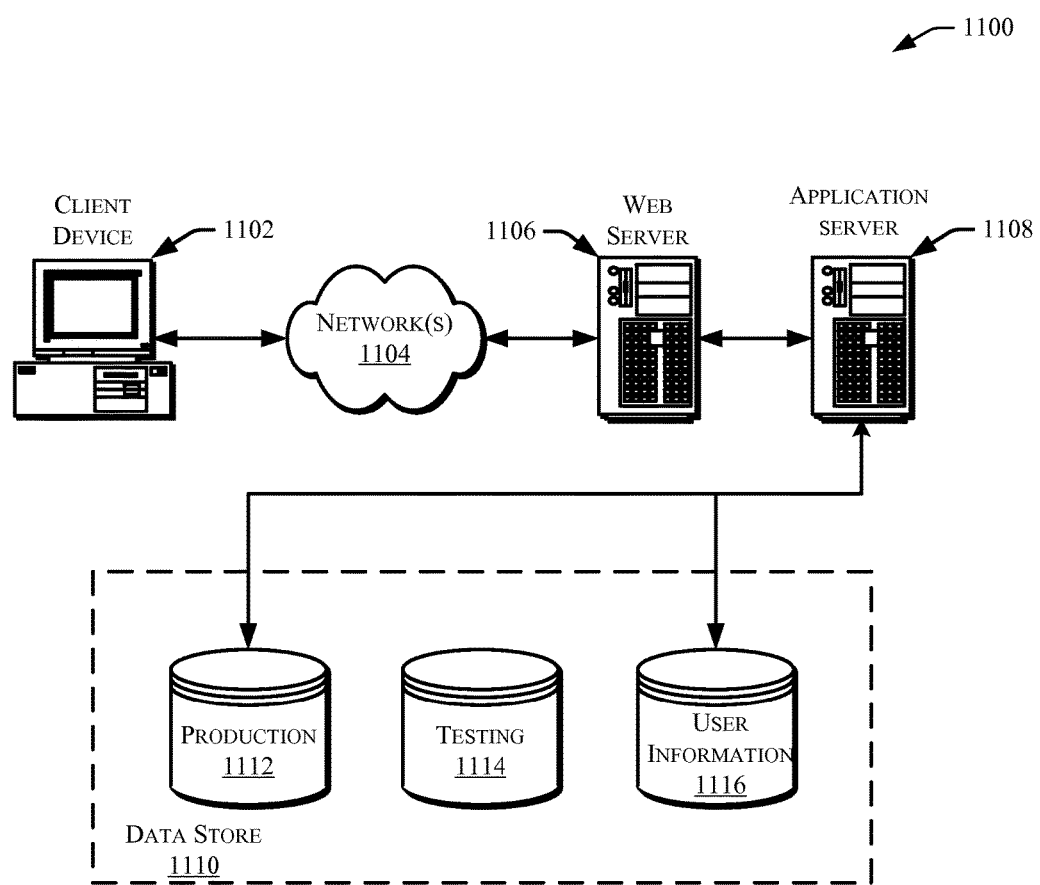
FIG. 11 illustrates an environment in which various embodiments of the event reminder described herein can be implemented, according to at least one example.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing a reminder to a user, comprising:
   receiving, by a computer system, a reminder from a browser utilized by a user;
   receiving, by the computer system, a registered interest associated with the reminder, the reminder and the registered interest associated with the reminder being unique to the browser utilized by the user and associated with a browser identification;
   directing, by the computer system, the browser to provide the registered interest and information about accessing the reminder to an advertising service without providing the browser identification;
   receiving, by the computer system, a request for first content from the browser, the request for the first content based at least in part on the browser receiving an indication from the advertising service that the registered interest is selected from a plurality of registered interests and the information about accessing the reminder, the registered interest being selected instead of second content provided by the advertising service based at least in part on the browser identification received with the request for the first content from the browser; and
   providing, for presentation, to the browser utilized by the user, the reminder instead of the second content provided by the advertising service based at least in part on the registered interest and the browser identification, the reminder configured to be presented via a graphical user interface of the browser utilized by the user.

2. The computer-implemented method of claim 1, wherein receiving information about accessing the reminder from the advertising service comprises the advertising service selecting the registered interest in response to the request for the first content from the browser, and the advertising service returning the information responsive to selecting the registered interest.

3. The computer-implemented method of claim 2, wherein selecting is based at least in part on comparing budget information of the reminder to budget information of an advertisement from an advertising agency.

4. The computer-implemented method of claim 1, wherein directing the browser to provide the registered interest and information about accessing the reminder to the advertising service comprises providing a uniform resource locator (URL) to the advertising service and embedding the registered interest and information in the URL.

5. The computer-implemented method of claim 1, wherein at least one of the registered interest and the reminder includes at least one of the following: budget information, a date of the reminder, a lifetime of the reminder, or a text of the reminder.

6. The computer-implemented method of claim 1, wherein providing for presentation the reminder comprises providing the reminder and an advertisement to the browser.

7. The computer-implemented method of claim 1, wherein the request for the first content comprises a request associated with a television; and further comprising, providing for presentation the reminder to the television or a device associated with the television.

8. The computer-implemented method of claim 1, wherein the reminder provided to the browser includes a link to a recommended item in an electronic marketplace.

9. The computer-implemented method of claim 8, wherein the link is provided by a reminder agent.

10. A computer-implemented method for registering an interest associated with a reminder to an advertising service, comprising:
    receiving, by a computer system, a reminder from a browser utilized by a user;
    receiving, by the computer system, a registered interest associated with the reminder, the reminder and the registered interest associated with the reminder being unique to the browser utilized by the user and associated with a browser identification;
    directing, by the computer system, the browser to provide the registered interest and information about accessing the reminder to an advertising service without providing the browser identification; and
    in response to receiving, by the computer system, a request for first content from the browser:
       providing for presentation, to the browser utilized by the user, the reminder instead of second content based at least in part on the registered interest and the browser identification, the reminder configured to be presented via a graphical user interface of the browser utilized by the user, the second content provided by the advertising service or a third party,
       wherein the request for the first content is based at least in part on the browser receiving an indication from the advertising service that the registered interest is selected from a plurality of registered interests and the information about accessing the reminder, the registered interest being selected instead of the second content provided by the advertising service or the third party based at least in part on the browser identification received with the request for the first content from the browser.

11. The computer-implemented method of claim 10, wherein directing the browser to provide the registered interest and information about accessing the reminder to the advertising service comprises providing a URL to the advertising service and embedding the registered interest and information in the URL.

12. The computer-implemented method of claim 10, wherein the reminder, the registered interest, or both, includes at least one of the following: a bid fee, a flat fee, a commission fee, or a fixed fee.

13. A system for providing a reminder, comprising:
    one or more processors; and
    memory including instructions executable by the one or more processors that, when executed by the one or more processors, cause the system to at least:
       receive a reminder from a browser utilized by a user;
       receive a registered interest associated with the reminder, the reminder and the registered interest associated with the reminder being unique to the browser utilized by the user and associated with a browser identification;

direct the browser to provide the registered interest and information about accessing the reminder to an advertising service without providing the browser identification;

receive a request for first content from the browser based at least in part on the browser receiving an indication from the advertising service that the registered interest is selected from a plurality of registered interests and the information about accessing the reminder, the registered interest being selected instead of second content provided by the advertising service based at least in part on the browser identification received with the request for the first content from the browser; and provide, for presentation, to the browser utilized by the user, the reminder instead of the second content based at least in part on the registered interest and the browser identification, the reminder configured to be presented via a graphical user interface of the browser utilized by the user, the second content being provided by the advertising service or a third party.

14. The system of claim 13, wherein providing for presentation to the browser the reminder comprises providing the reminder and an advertisement to the browser.

15. The system of claim 14, wherein the advertisement includes a targeted advertisement.

16. The system of claim 13, further comprising:
wherein the request for the first content is associated with a mobile application; and further comprising, providing for presentation the reminder to the mobile application.

17. A non-transitory computer-readable storage medium having stored thereon instructions that, when executed by one or more processors of a computer system, cause the computer system to at least:
receive a reminder from a browser utilized by a user;
receive a registered interest associated with the reminder, the reminder and the registered interest associated with the reminder being unique to the browser utilized by the user and associated with a browser identification;
direct the browser to provide the registered interest and information about accessing the reminder to an advertising service without providing the browser identification;
receive a request for first content from the browser based at least in part on the browser receiving an indication from the advertising service that the registered interest is selected from a plurality of registered interests and the information about accessing the reminder, the registered interest being selected instead of second content provided by the advertising service based at least in part on the browser identification received with the request for the first content from the browser; and
provide, for presentation, to the browser utilized by the user, the reminder instead of the second content provided by the advertising service based at least in part on the registered interest and the browser identification, the reminder configured to be presented via a graphical user interface of the browser utilized by the user.

18. The non-transitory computer-readable storage medium of claim 17, wherein the request for the first content from the browser includes generating the request for the first content in response to the browser receiving the information about accessing the reminder from the advertising service.

\* \* \* \* \*